E. H. ASHCROFT.
WATER-INDICATORS FOR STEAM-GENERATORS.
No. 181,127. Patented Aug. 15, 1876.
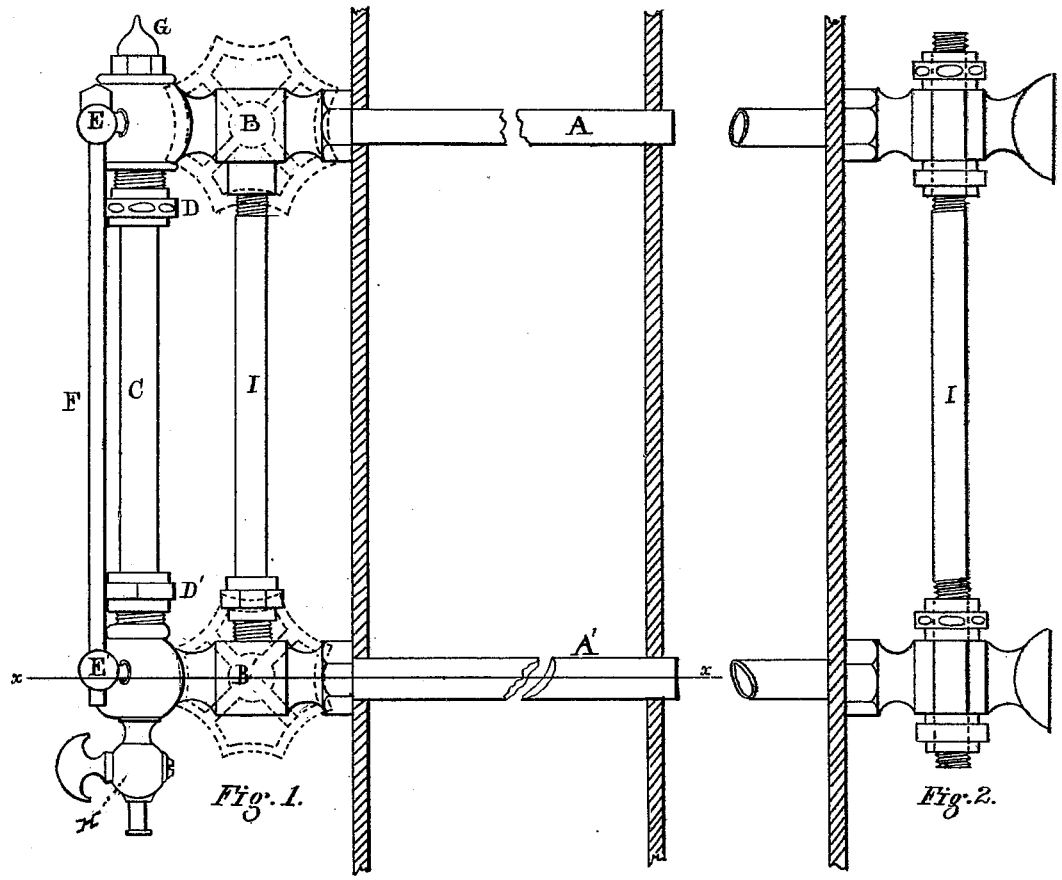

UNITED STATES PATENT OFFICE.

EDWARD H. ASHCROFT, OF BOSTON, MASSACHUSETTS.

IMPROVEMENT IN WATER-INDICATORS FOR STEAM-GENERATORS.

Specification forming part of Letters Patent No. 181,127, dated August 15, 1876; application filed June 3, 1876.

*To all whom it may concern:*

Be it known that I, EDWARD H. ASHCROFT, of Boston, in the county of Suffolk and State of Massachusetts, have invented certain new and useful Improvements in Water-Indicators for Steam-Generators; and I do hereby declare that the following is a full, clear, and exact description thereof, which will enable others skilled in the art to which it appertains to make and use the same, reference being had to the accompanying drawing, and to letters of reference marked thereon, which form a part of this specification—

Figure 1 being an elevation of an indicator, showing, in section, a portion of a boiler-head and of a wall, through which the connecting-pipes may pass, the remainder of devices being shown in elevation and representing the cocks or valves, a glass tube for the water, guard-rods for the protection of said tube, and an adjusting tube or rod for supporting the cocks or valves, and for keeping them in position, and fixing such position. Fig. 2 is an elevation of a modification of the adjusting-rod, showing how it may be placed in the slots formed in the cocks or valves, and be provided with nuts for adjusting the positions thereof, and Fig. 3 is a section, on *x x*, of Fig. 1, showing one of the valves with its pipe and the projections which receive and hold the guard-rods.

This invention relates to that class of water-indicators in which a glass tube is used for showing the position of the surface of the water in the generator, it being connected therewith by means of cocks or valves, and suitable pipes for the passage of water and steam.

As these indicators have heretofore been constructed the glass tubes have been liable to fracture from the fact that when the cocks or valves in which they have been placed have been connected with the generator by means of pipes, they have been liable to be sprung out of line either in fixing them in position or afterward by being pressed upon, and thus a strain has been brought upon the tubes, which, in many cases, has been sufficient to fracture them.

The object of the present invention is to provide a remedy for the difficulties above named, and others that arise; and to this end it consists in providing an adjusting and supporting connection between the cocks or valves in which the glass tube is fixed, which shall be so arranged that the distance vertically between said cocks or valves can be adjusted thereby, and so that they cannot be turned when in use, and thus endanger the breaking of the tubes; and, further, so that one of the cocks or valves cannot be pushed aside without a corresponding movement of the other, which, if allowed, would result in the breaking of the tube and a consequent suspension of the functions of the indicator.

In constructing indicators of this character I use two pipes, A A', which may be of any desired length and may constitute a part of the cocks or valves, or they may be of any suitable kind of piping, and have their inner ends provided with screw-threads for securing them to the head or other portion of the generator, while their outer ends may be connected to the shank of the cock or valve. These pipes or shanks may be of any length required to cause them to extend through the wall of the furnace, or to carry the indicator to any desired distance from the generator. The cocks or valves are shown at B B', and may be in the form of an ordinary plug-cock, with an aperture in them for the passage of steam and water; or they may be in the form of a valve, with a screw-thread upon their spindles, as shown in Fig. 3, there being one in the upper pipe for controlling the flow of steam to the indicator, and one in the lower one to regulate the flow of water thereto. The outer ends of the cocks or valves are provided with enlargements, which are bored out upon one of their sides to receive the end of the glass indicating tube C, the apertures thus formed being provided with an interior screw-thread for the reception of packing-boxes D D', which, together with suitable packing placed under them, prevent the passage of steam or water around the tube. Projecting from the enlargements upon the outer ends of the cocks or valves are supports E E', in which are formed apertures for the reception of the guard-rods F F', which serve to protect the glass tube and prevent it from being broken. The upper enlargement referred to is provided with a nut, G, which may be removed for the insertion of the tube when the cocks or valves are in position for use; and the lower one is provided with a small cock, H, by means of which the water may at any time be drawn out of the tube by closing the lower cock B', when steam will be forced through the tube, and thus it will be cleared; or by shutting both the cocks or valves B B', the water may be drawn off and the tube removed and replaced.

The parts thus far described are in common use and form no part of my present invention, it consisting in the combining, with the cocks or valves, of an adjusting and supporting connection, I, which serves to regulate the distance between them, and also to support them in such other relation to each other that they will not move out of their adjusted position to such an extent as to permit any undue strain to be put upon the tube C. In Fig. 1 of the drawing the connection above alluded to is shown as consisting of tube or rod, one end of which is provided with a screw, which enters a projection formed on one of the cocks or valves, while its opposite end is furnished with a nut, which revolves freely upon the rod or pipe, and which is made to screw upon a thread formed upon a projection from the opposite cock or valve. The arrangement of these parts with reference to the valves is such that when the pipes A A' have been screwed into the generator and the valves adjusted therein or thereon, the tube or rod I may be put in place by screwing its upper end into the valve and turning the nut, upon its lower end, upon its thread, after which, by turning the tube or rod, the distance between the valves may be regulated, in the doing of which the two will be firmly connected, and will be supported in such a manner that neither can be turned or moved so as to endanger the tube C, the uniting of them preventing any independent movement of either in any direction.

In Fig. 2 I have shown how an equivalent method of connecting and supporting the valves may be adopted, the device for that purpose consisting of a rod of metal, 1, having upon its ends a screw-thread, and being provided with nuts upon each of its ends, so that when the rod has been placed in a groove formed in the enlargement upon the valves, or inserted into an aperture formed therein, the nuts may be turned in such directions as to adjust the valves with reference to each other, and then secure and support them in their positions.

Having thus described my invention, what I claim, and desire to secure by Letters Patent, is—

In combination with the cocks or valves of a water-indicator, a connection extending from one to the other, and so arranged with reference to the valves that the distance between them can be varied, and, when properly adjusted, it shall prevent undue strain upon the glass tube, substantially as set forth.

In testimony that I claim the foregoing as my own invention I affix my signature in presence of two witnesses.

EDWARD H. ASHCROFT.

Witnesses:
  M. LUSCOMB,
  F. T. TAPLEY.